United States Patent
Kimura

(10) Patent No.: US 10,621,427 B2
(45) Date of Patent: Apr. 14, 2020

(54) INFORMATION PROCESSING APPARATUS, STORAGE MEDIUM, AND INFORMATION PROCESSING METHOD FOR CHARACTER RECOGNITION BY SETTING A SEARCH AREA ON A TARGET IMAGE

(71) Applicant: CANON KABUSHIKI KAISHA, Tokyo (JP)

(72) Inventor: Mitsuo Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 15/823,264

(22) Filed: Nov. 27, 2017

(65) Prior Publication Data
US 2018/0150689 A1 May 31, 2018

(30) Foreign Application Priority Data
Nov. 29, 2016 (JP) .................... 2016-230827

(51) Int. Cl.
| | |
|---|---|
| G06K 9/00 | (2006.01) |
| G06K 9/46 | (2006.01) |
| G06K 9/62 | (2006.01) |
| G06K 9/32 | (2006.01) |
| G06K 9/34 | (2006.01) |

(52) U.S. Cl.
CPC ..... G06K 9/00463 (2013.01); G06K 9/00456 (2013.01); G06K 9/325 (2013.01); G06K 9/3283 (2013.01); G06K 9/344 (2013.01); G06K 9/4642 (2013.01); G06K 9/621 (2013.01); *G06K 2209/01* (2013.01)

(58) Field of Classification Search
CPC .. G06K 9/00463; G06K 9/621; G06K 9/4642; G06K 9/00456; G06K 9/3283; G06K 9/325; G06K 9/344; G06K 2209/01
See application file for complete search history.

(56) References Cited

U.S. PATENT DOCUMENTS 5,729,630 A * 3/1998 Ikeda ................. G06K 9/6807
382/229
6,636,631 B2 * 10/2003 Miyazaki ........... G06K 9/00449
382/161
8,189,961 B2 * 5/2012 Nijemcevic .......... G06K 9/3283
382/100

(Continued)

FOREIGN PATENT DOCUMENTS

JP          2004-46723 A     2/2004

*Primary Examiner* — Xuemei G Chen
(74) *Attorney, Agent, or Firm* — Canon U.S.A., Inc. I.P. Division

(57) ABSTRACT

A search area is set on a recognition target image, cutout areas are set at a plurality of positions in the search area, images corresponding to the plurality of set cutout areas are extracted, similarities of candidate characters obtained by comparison between the extracted images and dictionary data is weighted in accordance with the positions of the cutout areas. In such a manner, evaluation values of the candidate characters are obtained, and a candidate character with the highest evaluation value among the obtained candidate characters is output as a recognition result. Further, a search area relating to a next character is set based on position information about the cutout area corresponding to the recognition result.

15 Claims, 17 Drawing Sheets

(56) References Cited

U.S. PATENT DOCUMENTS

| | | | | |
|---|---|---|---|---|
| 8,225,205 B2* | 7/2012 | Itami | .................... | G06F 17/212 |
| | | | | 715/256 |
| 8,452,095 B2* | 5/2013 | Maekawa | ................ | G06K 9/40 |
| | | | | 382/176 |
| 8,542,926 B2* | 9/2013 | Panjwani | .......... | G06K 9/00469 |
| | | | | 382/176 |
| 8,786,633 B2* | 7/2014 | Dairman | ................ | G01C 23/00 |
| | | | | 345/638 |
| 9,001,393 B2* | 4/2015 | Shibutani | ............... | G06K 9/344 |
| | | | | 348/468 |
| 9,069,462 B2* | 6/2015 | Andersson | .......... | G06F 3/04883 |
| 9,465,774 B2* | 10/2016 | Maison | ................... | G06F 17/21 |
| 9,536,141 B2* | 1/2017 | Saund | ................ | G06K 9/00449 |
| 9,977,957 B2* | 5/2018 | Goto | ....................... | G06K 9/38 |
| 10,074,042 B2* | 9/2018 | Wang | ................... | G06K 9/6828 |
| 10,134,138 B2* | 11/2018 | Kimura | ..................... | G06T 7/11 |
| 2004/0205568 A1* | 10/2004 | Breuel | ................. | G06F 17/211 |
| | | | | 715/205 |
| 2008/0063276 A1* | 3/2008 | Vincent | ................... | G06K 9/03 |
| | | | | 382/182 |
| 2008/0292186 A1* | 11/2008 | Hamamura | ........... | G06K 9/723 |
| | | | | 382/177 |
| 2009/0161955 A1* | 6/2009 | Isshiki | ................... | G06K 9/348 |
| | | | | 382/177 |
| 2011/0097002 A1* | 4/2011 | Ishiguro | ................ | G06K 9/348 |
| | | | | 382/229 |
| 2015/0139559 A1* | 5/2015 | Smith | ................. | G06K 9/6215 |
| | | | | 382/225 |
| 2016/0300116 A1* | 10/2016 | Yasunaga | ............... | G06K 9/325 |

* cited by examiner

FIG.5
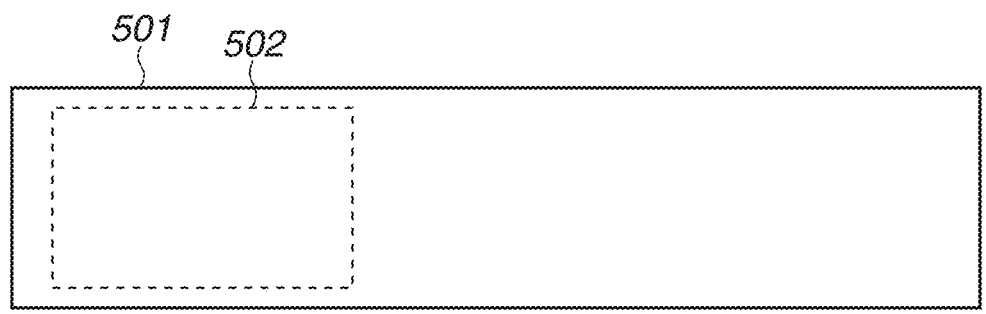
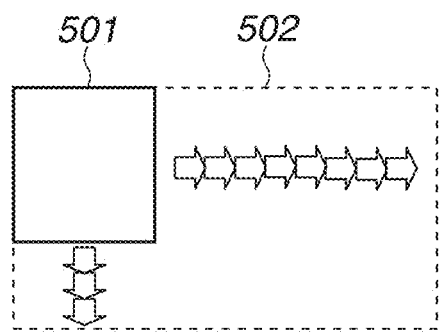
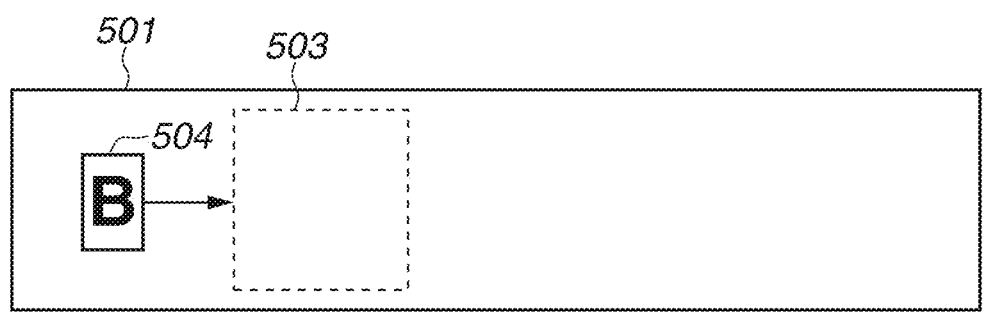
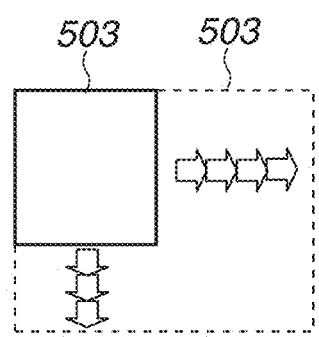

FIG.6
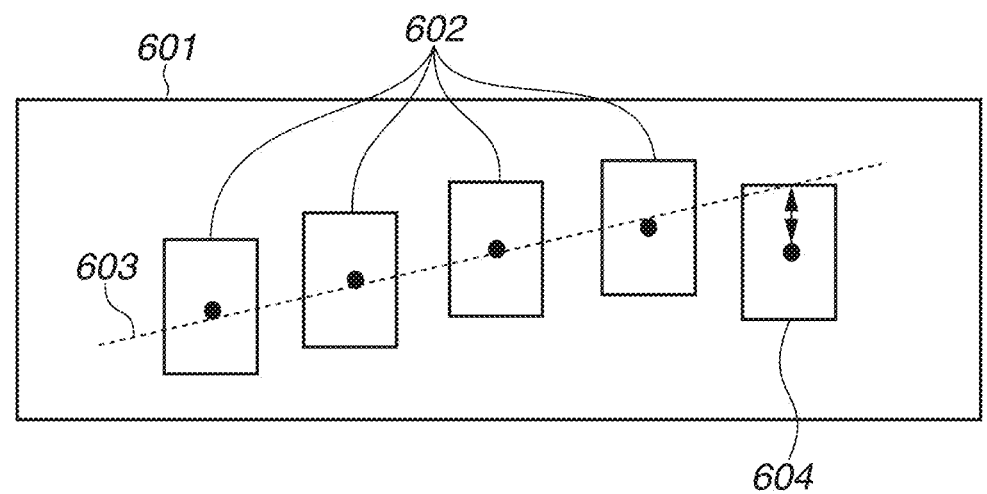
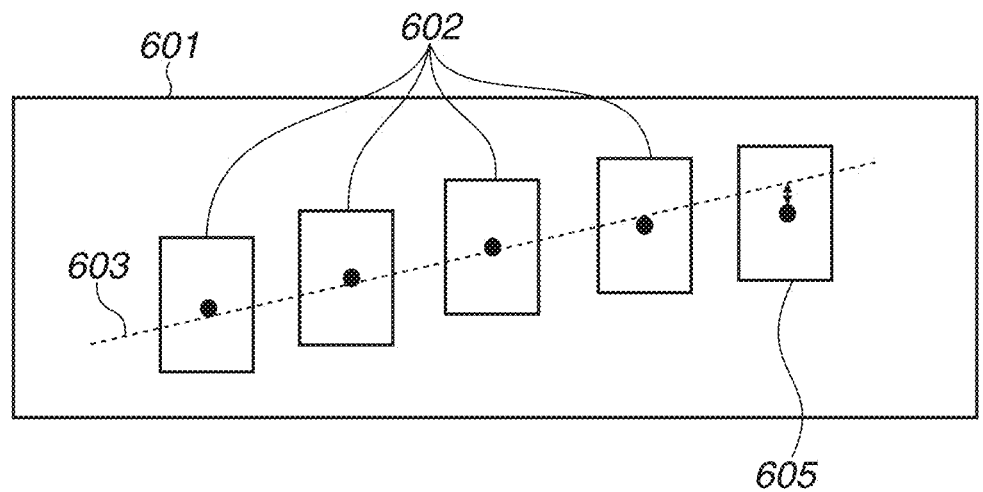

FIG.16
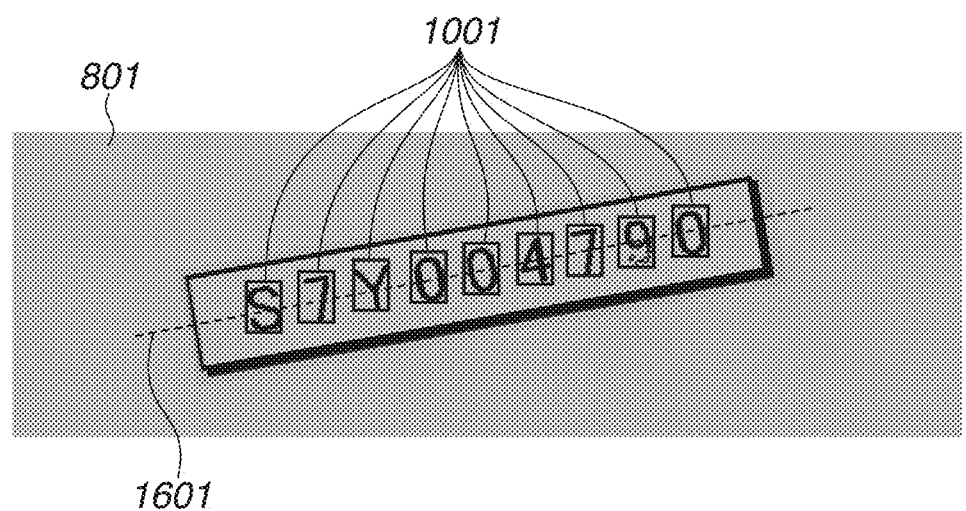
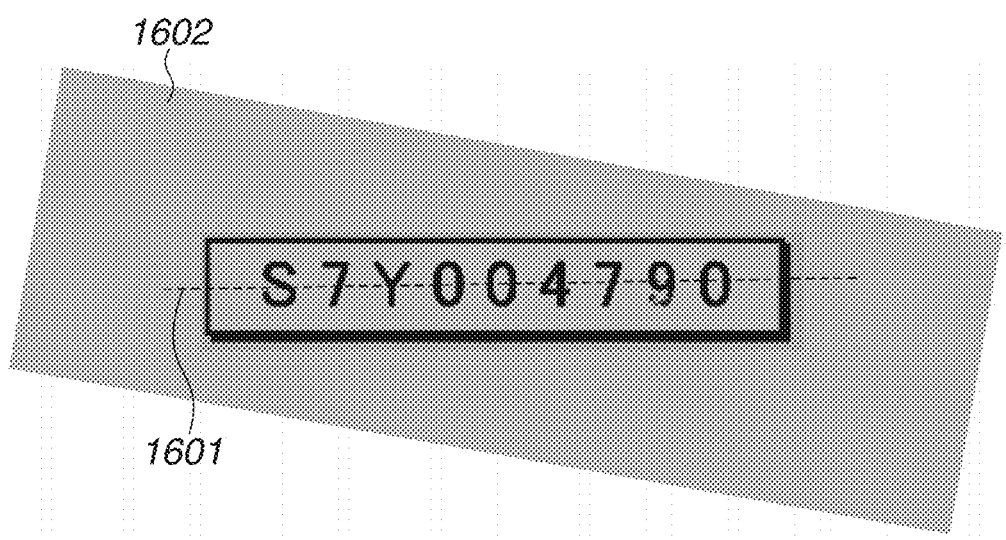

INFORMATION PROCESSING APPARATUS, STORAGE MEDIUM, AND INFORMATION PROCESSING METHOD FOR CHARACTER RECOGNITION BY SETTING A SEARCH AREA ON A TARGET IMAGE

BACKGROUND OF THE INVENTION

Field of the Invention

The aspect of the embodiments relates to character recognition processing.

Description of the Related Art

Conventionally, in recognition processing to be executed on characters on paper, an outline of a character is detected, a position of a character image is identified, and a character row in a horizontal or vertical direction is recognized. Then, an inclination of the recognized character row is corrected, a character image of each character is cut out from the character row, and each character is identified from the cutout character image. Therefore, if a character cutout position is inappropriate, a correct character cannot be recognized.

Japanese Patent Application Laid-Open No. 2004-46723 discusses a technique for obtaining a character arrangement pitch of cutout characters, and detecting, as a character cutout error, a portion where an irregular character arrangement pitch greatly deviating from an average value is caused.

Further, in recent years, wide usage of smart phones and digital cameras has enabled image information including character information to be easily acquired. As a result, there is a growing market for capturing characters from a wide variety of measurement environments. For example, there is such a use case that, in a quarry of mines, serial numbers engraved on tires are used for managing the tires used on dump trucks. In such a case, it is considered that the serial numbers engraved on the tires are captured by smart phones or digital cameras, the captured images are then subjected to character recognition processing, and the tires are managed by using the serial numbers as character recognition results. However, in the case of serial numbers engraved on the tires, contrast between characters and a background may be low or surfaces may be much soiled, and thus preconditions for such a case differ greatly from those for a case where characters on paper are recognized.

When the contrast between characters and a background is low or when the surfaces are much soiled, it is difficult to accurately detect character rows based on outlines of the characters because detection accuracy of the outlines is low. In addition, in images captured by smart phones, imaged subjects are more likely to be inclined than a case where documents are scanned by flatbed scanners. When images with inclined subjects are subjected to character recognition without considering the inclination, recognition accuracy is deteriorated.

SUMMARY OF THE INVENTION

According to an aspect of the embodiments, an apparatus of the disclosure includes a first setting unit configured to set a search area on a recognition target image, a second setting unit configured to set cutout areas at a plurality of positions in the search area, and a character detection unit configured to extract images corresponding to the plurality of cutout areas, weight similarities of candidate characters obtained by comparison between the extracted images and dictionary data in accordance with the positions of the cutout areas to obtain evaluation values of the candidate characters, and output, as a recognition result, a candidate character with a highest evaluation value among the obtained candidate characters. The first setting unit further sets a search area relating to a next character based on position information of the cutout area corresponding to the recognition result output from the character detection unit.

Further features of the disclosure will become apparent from the following description of exemplary embodiments with reference to the attached drawings.

BRIEF DESCRIPTION OF THE DRAWINGS

FIG. 5 is a conceptual diagram illustrating character recognition processing.

FIG. 6 is a conceptual diagram illustrating evaluation value calculation processing.

FIG. 16 is a diagram illustrating one example of rotation of a recognition target image.

DESCRIPTION OF THE EMBODIMENTS

As one example of an information processing apparatus according to a first exemplary embodiment, a mobile terminal will be described. The mobile terminal is a terminal communicable with an outside using a wireless communication capability.

Figure 1:
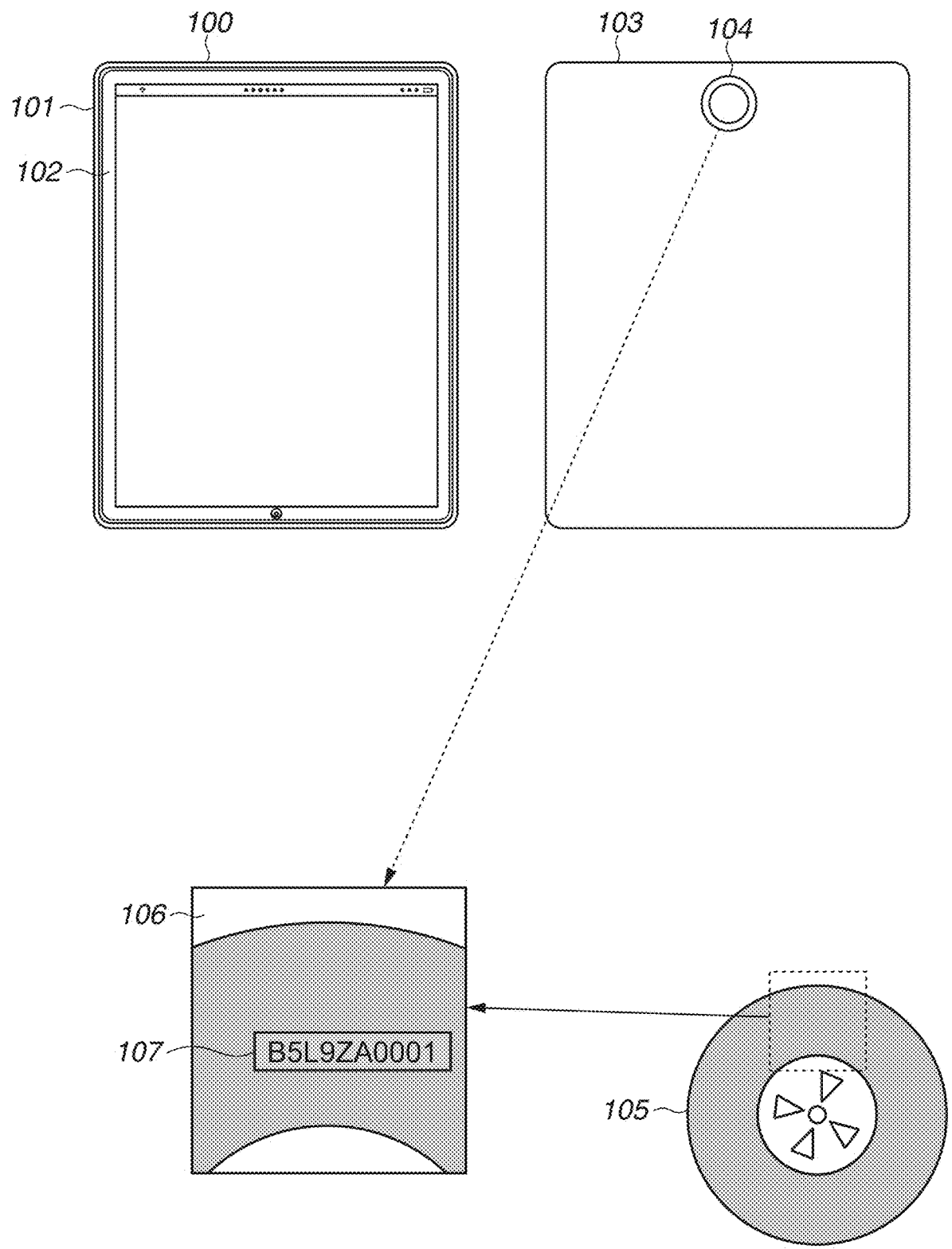
FIG. 1 is a diagram illustrating one example of an appearance of a mobile terminal.

FIG. 1 is a diagram illustrating an appearance of a mobile terminal 100 (a mobile terminal front face 101 and a mobile terminal rear face 103) and a tire as a subject 105. The mobile terminal front face 101 includes a touch panel 102, and has two capabilities of displaying an image and allowing touch operation input. The mobile terminal rear face 103 is provided with a camera unit 104 that captures and takes in an image of a subject. In the present exemplary embodiment, a user of the mobile terminal 100 can use a mobile application (details will be described below) that is operated by a central processing unit (CPU) of the mobile terminal 100 to capture an image of a subject 105 and to execute character recognition processing. The subject 105 in this case is a tire. A portion where a serial ID (a serial number) of a tire is described is imaged by the camera unit 104 of the mobile terminal 100 so that a captured image 106 can be obtained. A serial ID 107 indicates a serial number engraved on a tire, and uniquely identifies the tire.

In the present exemplary embodiment, a tire will be described as an example of the subject 105, but the subject is not limited to a tire. A mobile application described below enables an image of the subject 105 to be taken in and the image to be output to a touch panel 102.

Figure 2:
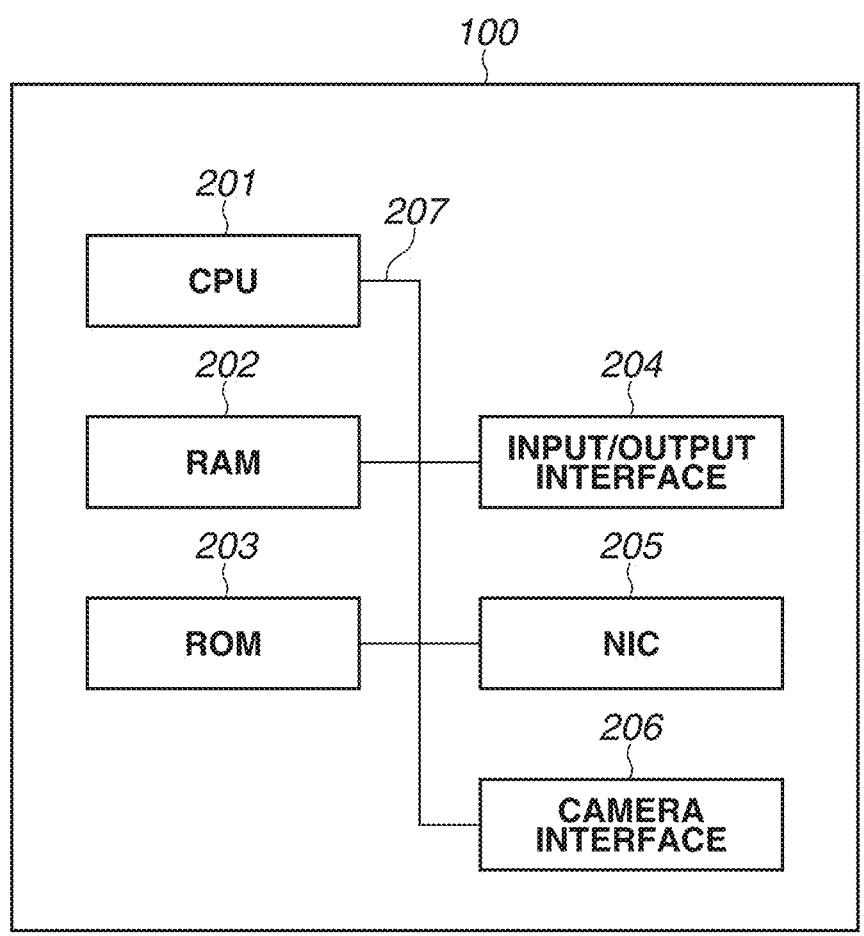
FIG. 2 is a block diagram illustrating one example of a hardware configuration.

FIG. 2 is a diagram illustrating one example of a hardware configuration of the mobile terminal 100. A central processing unit (CPU) 201 is a processing unit that executes various programs to realize various functions. A random access memory (RAM) 202 is a unit that is used as a storage area for various information and a transitory operating storage area of the CPU 201. A nonvolatile memory (for example, ROM) 203 is a unit that stores various programs and data. The CPU 201 loads a program stored in the nonvolatile memory 203 into the RAM 202 and executes the program. More specifically, the CPU (computer) 201 of the mobile terminal 100 executes the program to function as respective processing units described with reference to FIG. 3 and to execute respective steps in a sequence, described below. The nonvolatile memory 203 may be a flash memory, a hard disk drive (HDD), or a solid state disk (SDD). Some or all of the respective functions and processes relating to the sequence, described later, of the mobile terminal 100 may be realized by using exclusive hardware. An input/output interface 204 transmits and receives data to and from the touch panel 102. A network interface card (NIC) 205 is a unit that connects the mobile terminal 100 to a network (not illustrated). A camera interface 206 connects with the camera unit 104, and takes an image of the subject 105 into the mobile terminal 100. These units can transmit and receive data via a bus 207.

Figure 3:
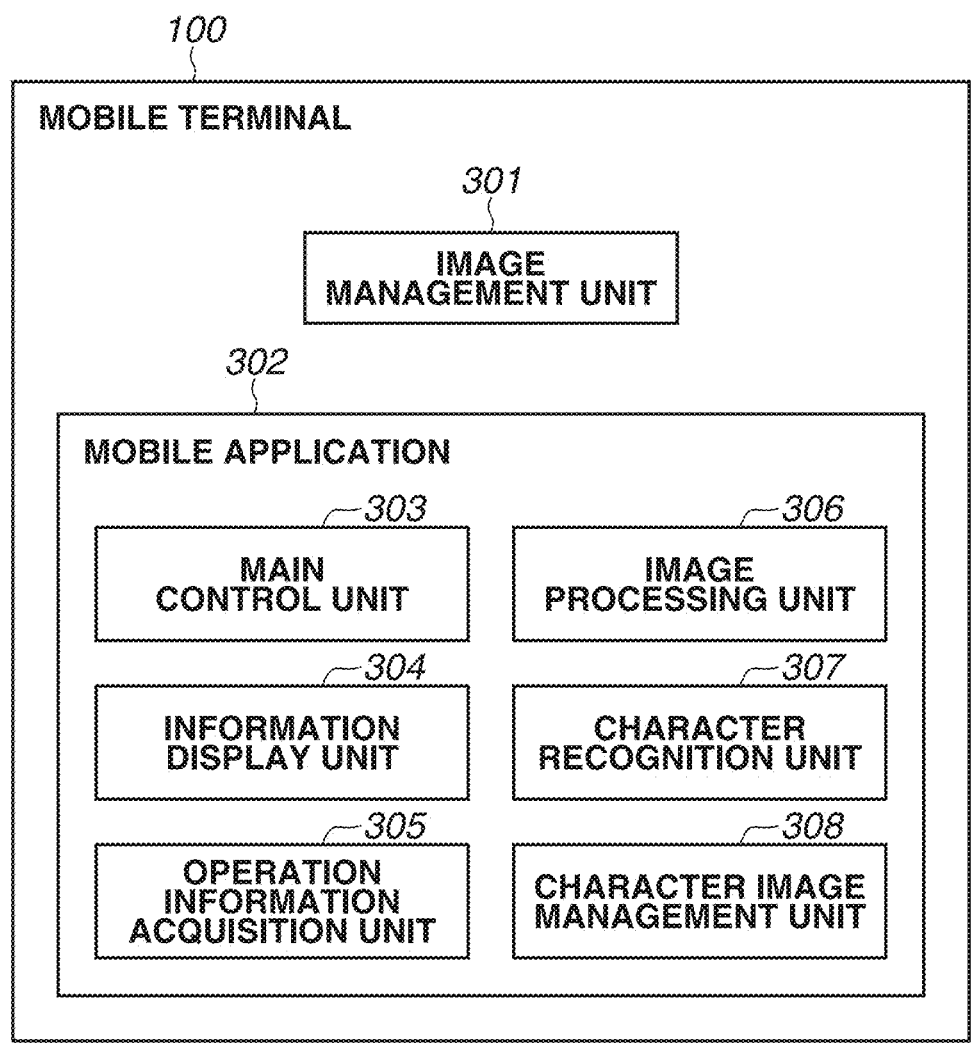
FIG. 3 is a block diagram illustrating one example of a software structure of a mobile terminal 100.

A software structure of the mobile terminal 100 will be described below. FIG. 3 is a conceptual diagram illustrating one example of the software structure in the mobile terminal 100. The CPU 201 of the mobile terminal 100 executes a mobile application (an application program for the mobile terminal) 302 to serve as respective processing units (respective processing modules) 303 to 308. Further, an operating system (OS) (not illustrated) of the mobile terminal 100 serves as an image management unit 301.

The image management unit 301 manages an image and application data. The OS provides a control application programming interface for utilizing the image management unit 301. Respective applications cause the image management unit 301 to acquire and save an image and application data by utilizing the control API.

The mobile application 302 is an executable application downloaded and installed by using an install function of the OS of the mobile terminal 100. The mobile application 302 executes various data processing on images of the subject 105 captured via the camera interface 206.

A main control unit 303 performs instruction and management on respective module units (303 to 308).

Figure 7:
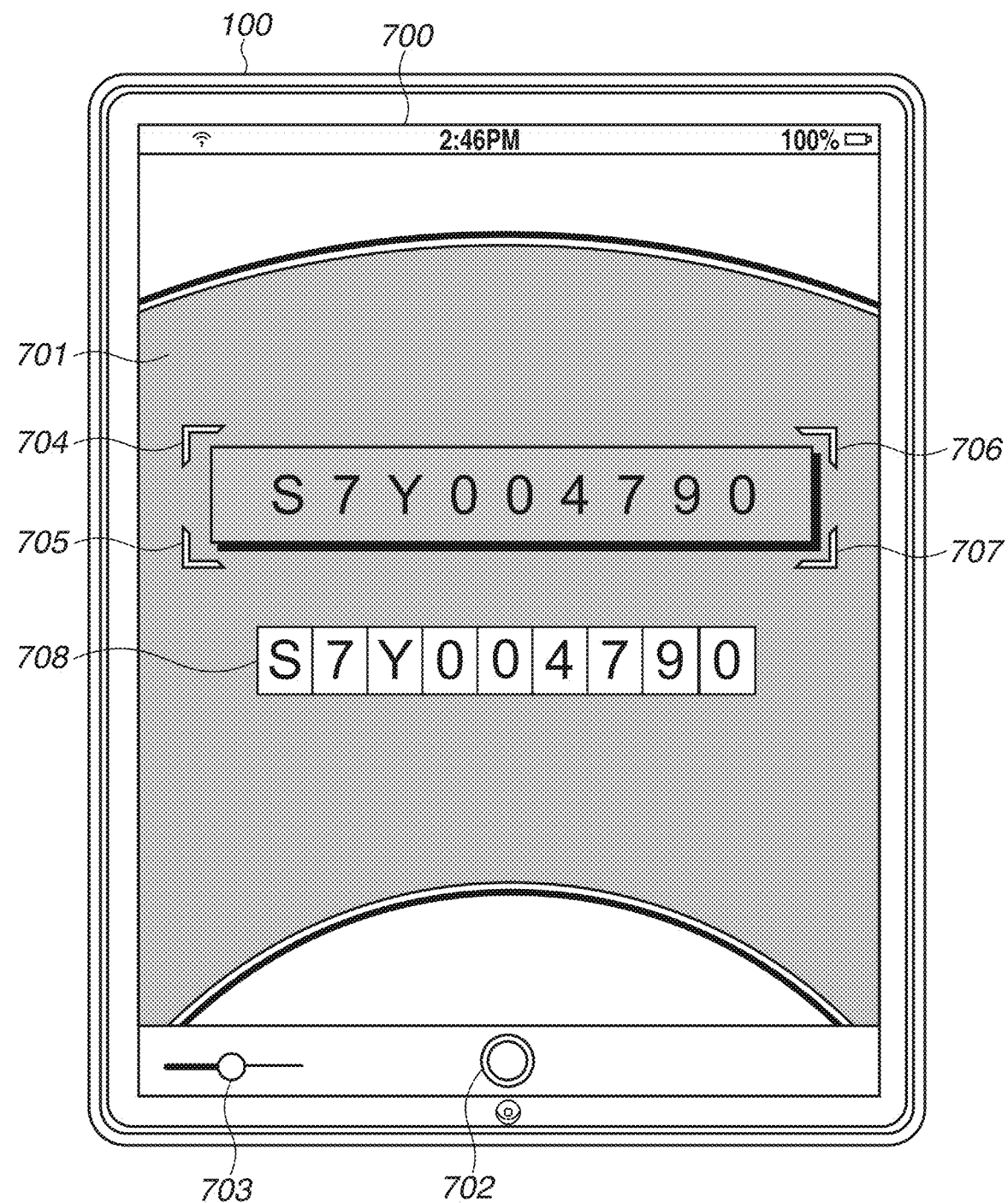
FIG. 7 is a diagram illustrating an example of a recognition result display screen.

The information display unit 304 is controlled so that a user interface (UI) of the mobile application 302 illustrated in FIG. 7 is displayed on a touch panel in accordance with an instruction from the main control unit 303.

FIG. 7 is a diagram illustrating one example of a screen (mobile terminal screen 700) of the UI of the mobile application 302 (UI of the mobile terminal). The mobile terminal screen 700 is displayed on the touch panel 102 of the mobile terminal 100. The mobile terminal screen 700 displays an image captured by the camera unit 104 on an area 701, and accepts an operation from a user (user operation) for an image and the UI. A shutter button 702 is a button for saving an image input from the camera unit 104 in the RAM 202 or the image management unit 301, and the saved image will be referred to as a captured image. A zoom button 703 is a button for enlarging/reducing a display image. Guides 704 to 707 serve as guides for determining a position of a recognition target to be imaged. The user adjusts an imaging position so that the serial ID 107 as a recognition target is within a rectangular area surrounded by four guides, and images a tire. A character recognition result of the serial ID 107 is displayed in a display area 708. When the recognition result is not correct, the user touches a character to be corrected in the recognition result display area 708 to correct the recognition result.

A form of the UI of the mobile application 302 (position, size, range, disposition, display content, etc.) is not limited to the illustrated form, and any suitable configuration may be employed as long as the function of the mobile terminal 100 can be realized.

Referring back to FIG. 3, the respective modules will be described. An operation information acquisition unit 305 acquires information relating to a user operation performed on the UI of the mobile application 302, and notifies the main control unit 303 of the acquired information. For example, when the area 701 is touched by a user's hand, the operation information acquisition unit 305 senses information about a touched position on the screen and transmits information about the sensed position to the main control unit 303.

In one embodiment, an image processing unit 306 performs image processing for character recognition on the captured image of the subject 105 captured via the camera interface 206. The image processing includes gray-scale conversion, edge extraction, and extraction of a feature amount.

A character recognition unit 307 cuts out a plurality of areas estimated to have characters from the image processed by the image processing unit 306, and compares images on the areas with character image information (dictionary data) of comparison targets to determine most similar characters.

Figure 4:
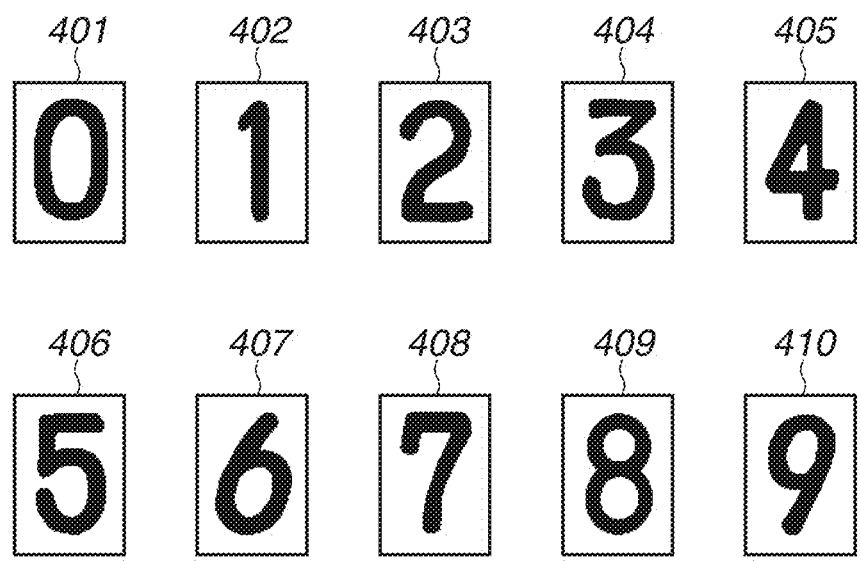
FIG. 4 is a diagram illustrating one example of character image information (dictionary data).

A character image management unit 308 manages character image information to be used as a comparison target (information to be used as dictionary data of a character recognition dictionary) when the character recognition unit 307 recognizes a character. FIG. 4 illustrates an example of character image information to be used as a comparison target when the character recognition unit 307 recognizes a character from an image. The character image information is prepared for each type of characters used in a tire, which is a recognition target. Character image information 401 to 410 indicate examples of numerical images, but the serial ID 107 of the tire as the recognition target in the present exemplary embodiment includes character images of capital alphabetical letters (not illustrated) as well as numerals.

The character image information (dictionary data) managed by the character image management unit may be feature information representing features of the respective characters created based on a font of characters engraved in the tire. Alternatively, the character image information may be images of the respective characters themselves. A type of the dictionary data to be used may be decided according to an algorithm to be used when an image of a recognition target is checked against the dictionary data.

FIG. 5 is a diagram describing the character recognition processing in the present exemplary embodiment. A recognition target image 501 is an image that is obtained by partially cutting out the image of the subject 105 captured via the camera unit 104 and the camera interface 206. As described with reference to FIG. 7, the user adjusts an image-capturing position so that the serial ID 107 fits within the guides (704 to 707 in FIG. 7) presented in the UI of the mobile application 302 and captures an image of the tire. The mobile application 302 cuts out an image on a portion surrounded by the guides from the captured image and uses the image as the recognition target image 501.

The serial ID 107 of the tire has a format specific to a manufacturer. In the present exemplary embodiment, the serial ID 107 has 9 digits and is composed of numerals and capital letters.

Since an image obtained by imaging a serial ID engraved on a tire may have low contrast between characters and a background or a surface of the tire (subject) may be soiled, it is difficult to accurately detect outlines of characters. Therefore, application of a conventional technique for cutting out characters based on outlines of the characters is more likely to cause erroneous cutout of the characters. This results in deterioration in accuracy of the character recognition processing. For this reason, in the present exemplary embodiment of the disclosure, an area where characters are supposed to be present is set as a search area. Then, a plurality of cutout areas is set while a position and a size are varied within the set search area, and a plurality of area images is repeatedly cut out. Arrow marks in the drawing indicate that the plurality of area images is repeatedly cut out. Each of the plurality of cutout area images is compared with the dictionary data (the character image information of a comparison target managed by the character image management unit), and character recognition results and evaluation values of the respective area images are obtained. Details of obtaining the evaluation values will be described below. Thereafter, a character recognition result with the highest evaluation value among the results and the cutout area used for obtaining that character recognition result are determined as a recognition result in the search area. A search area for a next character is set based on the position of the cutout area of the recognition result, and the similar processing is repeated. In the present exemplary embodiment, the serial ID 107 of 9 digits included in the recognition target image 501 is recognized sequentially starting from a first digit character (a leftmost character).

A search area 502 of the first digit character is set at a position separated from a left end of the recognition target image 501, cut out based on the guides 704 to 707, by predetermined coordinates. The position of the first search area 502 is supposed to be set in advance as an area where a leftmost character is more likely to be present when the recognition target image 501 fitting within the guides is captured. A cutout area 505 is set in the search area 502, and an image of the cutout area 505 is extracted to be compared with the dictionary data relating to the characters which are likely to appear in the first digit. Then, similarities between the image of the cutout area 505 and the characters included in the dictionary data are obtained, and evaluation values are calculated. Further, the cutout areas 505 are set at a plurality of positions, which is shifted from each other in a horizontal direction (x axis direction) and a vertical direction (y axis direction) in the search area 502. Images of the cutout areas in these positions are compared with the dictionary data, similarities are obtained, and evaluation values are calculated. More specifically, the cutout areas with a predetermined size are set at the plurality of places, respectively, so as to entirely cover the search area 502, and the images of the cutout areas at the respective positions are compared with the dictionary data. Thereafter, a width and a height of the cutout area 505 are changed, and the plurality of cutout areas is again set to entirely cover the search area 502, and image data is extracted to be compared with the dictionary data. For example, when the cutout area 505 is varied to have three kinds of widths and two kinds of heights, the cutout area 505 has a total of six sizes derived by 3×2 (=6). Further, in a case where the cutout area 505 is set at positions slid four times in the horizontal direction and four times in the vertical direction, the cutout area 505 is supposed to be set at 25 positions, derived by (4+1)× (4+1), in the search area 502. Since the cutout area has six variations of sizes and is set at the 25 positions, 6×25 (=150) images of the cutout areas are cut out from the search area 502. Every time an image is cut out, each image is compared with the dictionary data of characters that are likely to appear in the first digit (character image information of a comparison target). Then, similarities of the image with respect to the respective characters are obtained and evaluation values are calculated.

Among results of evaluating the images of all the cutout areas, a character having the highest evaluation value is determined as a recognition result of the first digit, and a position of the cutout area where the evaluation value is the highest is determined as a position of the first digit character. A cutout position 504 is a cutout position where "B" with the highest evaluation value is determined as the recognition result of the first digit character.

Thereafter, a search area 503 of a next adjacent character (a second character from the left) is set. The position of the search area 503 is set based on a relative position with respect to the position 504 of the recognition result of the first digit. Similarly to the case of the first digit, a plurality of cutout areas 506 is set in the search area 503 for a second digit character, an evaluation is made, and a character with a highest evaluation value is determined. Similarly, for a third digit and digits after the third one, setting of the search regions, setting of the cutout areas, and comparison of the similarities with the dictionary data are sequentially performed, and characters of recognition results are defined.

In consideration of a case where image capturing shifts to the right or the left, the search area 502 for a first digit character is set to be slightly wide. Meanwhile, since spaces between characters are predetermined in accordance with a character string of a subject, the search area 503 for each of second digit character and characters after the second digit may be set to be narrower than the search area 502.

FIG. 6 is a diagram illustrating an evaluation value calculating method according to the present exemplary embodiment. FIG. 6 includes a recognition target image 601 and areas 602 indicating cutout areas of the recognition result of first to fourth digits. Further, in FIG. 6, cutout areas 604 and 605 are candidates of cutout areas, among a plurality of cutout areas set for a fifth digit character, having higher similarities with the dictionary data. Black points illustrated inside the cutout areas 602 indicate center points of the respective cutout areas. An approximation straight line 603 is calculated by executing linear approximation processing based on coordinates of the center points of the cutout areas 602. In the present exemplary embodiment, the similarities obtained by comparing the candidates of the cutout areas with the dictionary data are weighted in accordance with distances between the candidates of the cutout areas and the approximation straight line, and thus evaluation values are calculated. At this time, a weight to be assigned to the similarity of the cutout area candidate is made larger, the shorter the distance is with respect to the approximation straight line. A distance between coordinates of the center point of the cutout area candidate 605 and the approximation straight line 603 is shorter than the distance between the coordinates of the center point of the cutout area candidate 604 and the approximation straight line 603. Therefore, the weight for the cutout area candidate 605 is made to be heavier than the weight for the cutout area candidate 604. Accordingly, even if the similarities between the plurality of the cutout area candidates and the dictionary data are equal to one another, the evaluation values of cutout area candidates closer to the approximation straight line are higher because the evaluation values are obtained by weighting based on the distance with respect to the approximation straight line.

Figure 8:
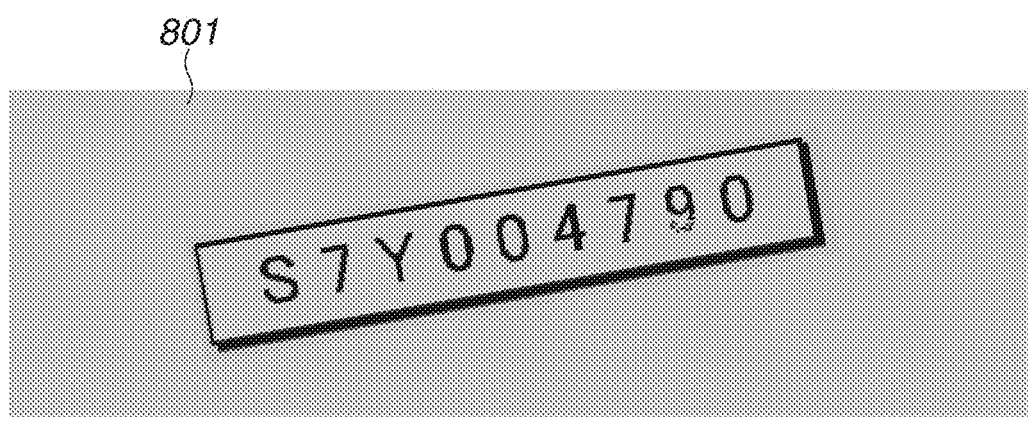
FIG. 8 is a diagram illustrating one example of a recognition target image.

FIG. 8 illustrates an example of a recognition target image captured on the mobile terminal screen 600 of FIG. 7. In this example, the serial ID 107 on a recognition target image 801 is captured in a state that the serial ID 107 inclines with respect to the mobile terminal screen 600. Further, as for the serial ID 107 in the recognition target image 801, an eighth character "9" from the left is an unclear character whose lower half portion looks patchy.

Figure 9:
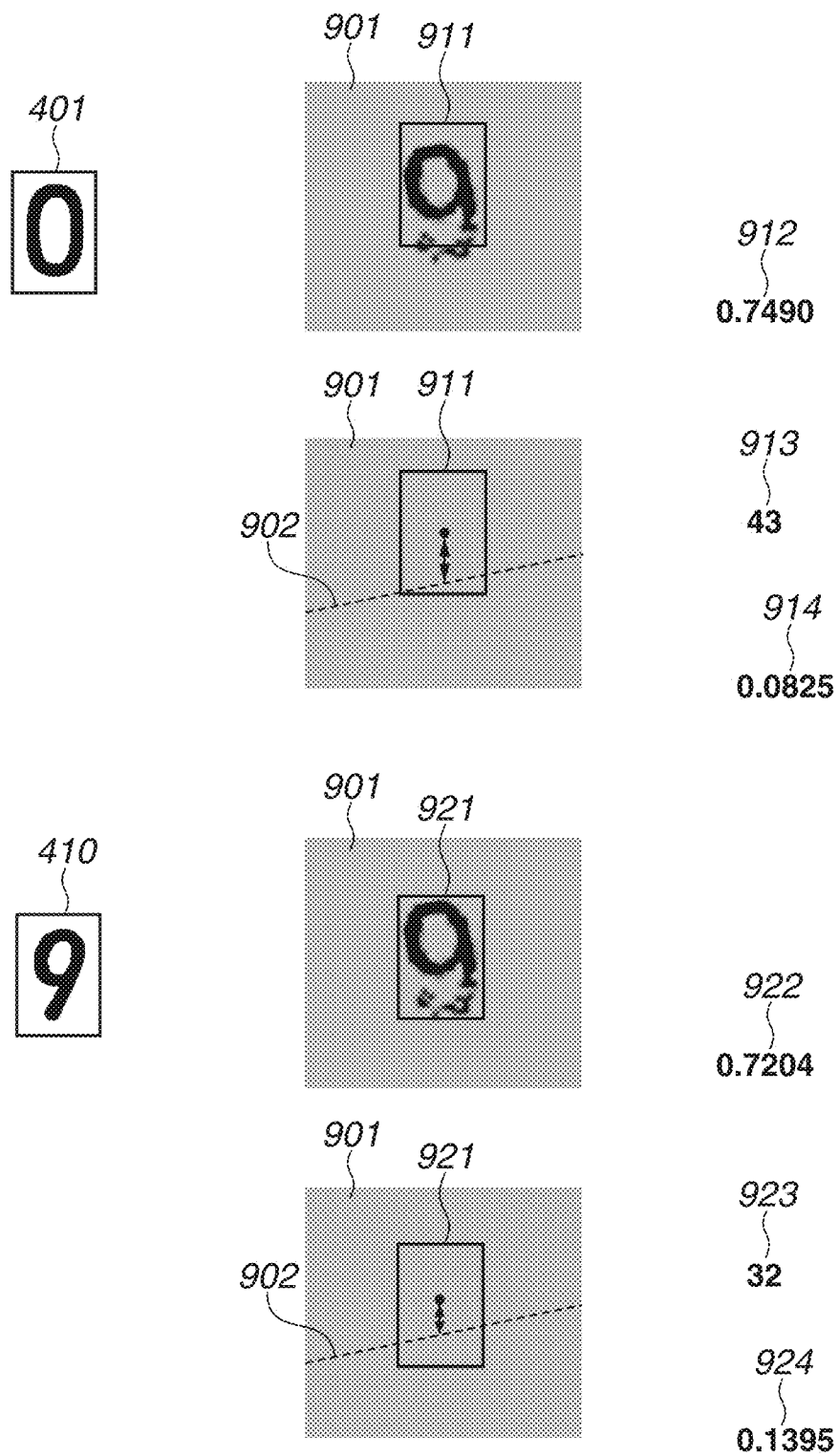
FIG. 9 is a diagram illustrating examples of cutout area candidates.

FIG. 9 is a diagram illustrating an eighth digit candidate on the cutout area in the character recognition processing for the serial ID 107 in FIG. 8. A search area 901 includes the eighth digit character. An approximation straight line 902 is calculated based on respective cutout areas obtained as recognition results of first to seventh digit characters.

A cutout area 911 is a candidate cutout area, among the plurality of cutout areas set in the search area 901, having the highest similarity with the dictionary data (character image information 401). A similarity value 912 is obtained by comparison between the character image information 401 and an image of the cutout area 911. A distance 913 indicates a distance between a center point of the cutout area 911 and the approximation straight line 902. An evaluation value 914 is obtained by weighting the similarity value 912 based on the distance 913.

Further, a cutout area 921 is a candidate cutout area, among the plurality of cutout areas set in the search area 901, having the highest similarity with the character image information 410 of the dictionary data. A similarity value 922 is obtained by comparison between the character image information 410 and an image of the cutout area 921. A distance 923 is a distance between a center point of the cutout area 921 and the approximation straight line 902. An evaluation value 924 is obtained by weighting the similarity value 922 based on the distance 923.

Note that among the plurality of cutout areas in the search area 901, since evaluation values obtained based on similarities and distances obtained through comparison against character image information other than the character image information 401 and the character image information 410 are smaller than the evaluation value 914 or 924, description thereof is omitted.

In the example of FIG. 9, the similarity value is higher for the character image information 401, but the evaluation value that is weighted based on the distance with respect to the approximation straight line is higher for the character image information 410. Therefore, the cutout area 921 and the character image information 410 are character recognition results in the search area 901.

In the present exemplary embodiment, the evaluation value is calculated by multiplying the similarity by a weight w. The weight w is calculated by an exponential function w of a distance d with respect to the approximation straight line ($w=a^d$ (for example, a is 0.95)). The weighting method, however, is not limited to this, and the weight may be larger in a case where the distance with respect to the approximation straight line is longer.

Figure 10:
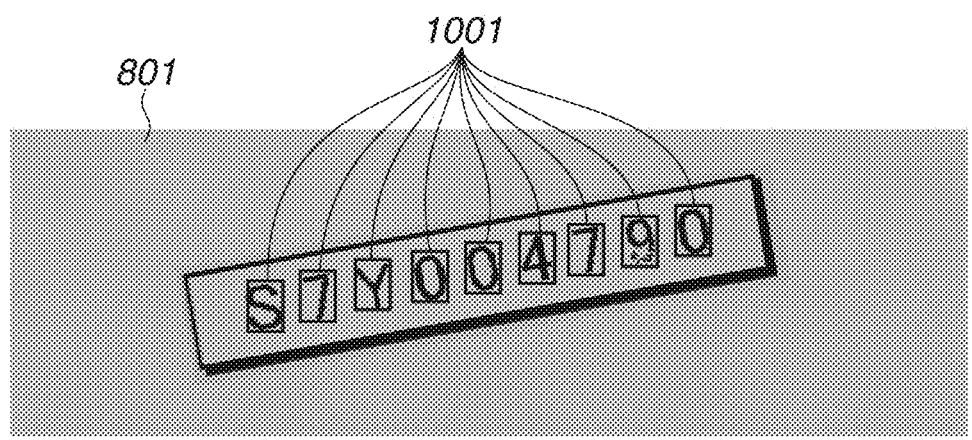
FIG. 10 is a diagram illustrating an example of a recognition result.

FIG. 10 is a diagram illustrating a result of executing the character recognition processing according to the present exemplary embodiment of the present disclosure for the recognition target image 801 in FIG. 8. A cutout area 1001 is obtained as a result of the character recognition processing, and a recognition result 1002 is obtained therefrom.

Figure 11:
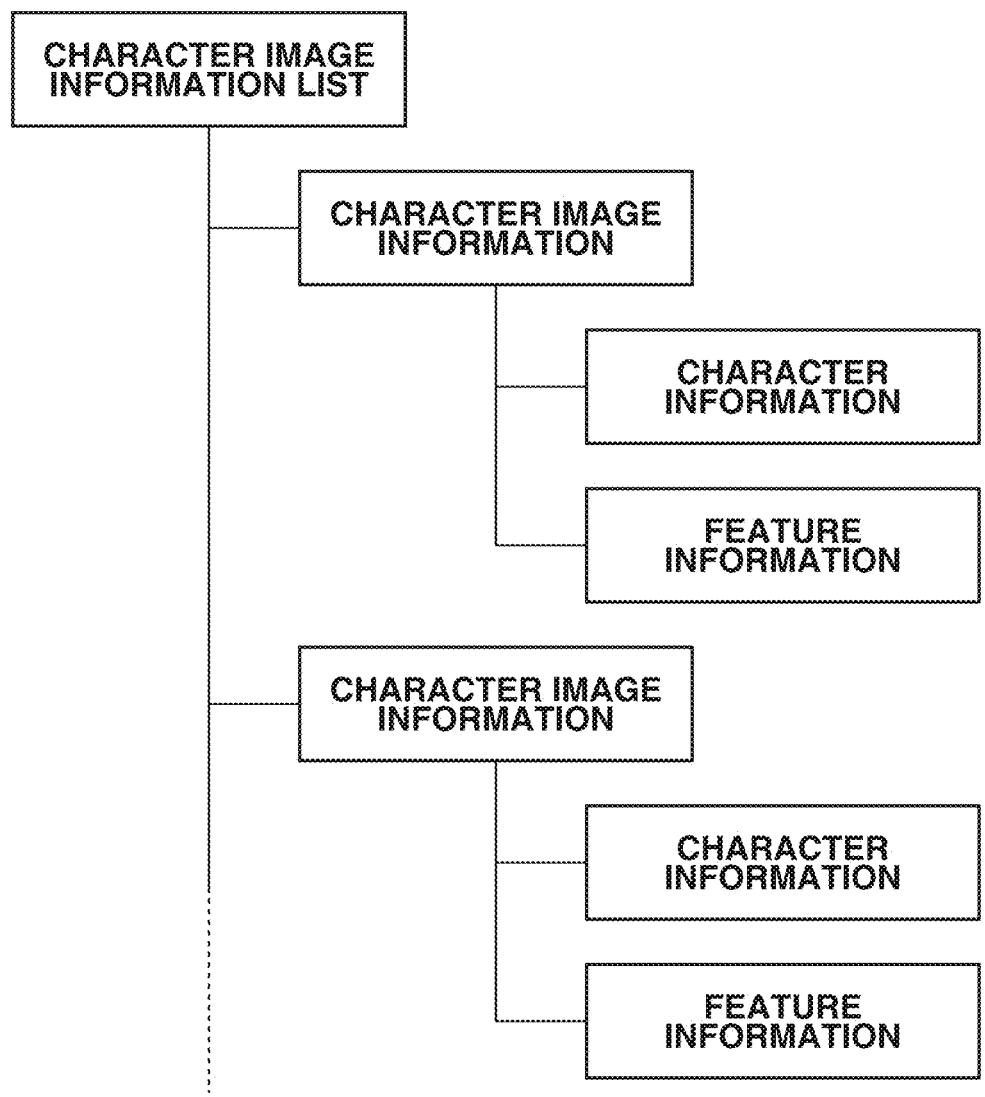
FIG. 11 is a block diagram illustrating one example of a data structure of character image information (dictionary data).

FIG. 11 illustrates one example of a data structure of character image information (dictionary data) to be managed by the character image management unit 308. A character image information list includes a plurality of pieces of character image information. The character image information (the dictionary data of a character recognition dictionary) includes character information (character codes) of respective characters and feature information extracted from respective character images of the characters. As the feature information about the respective characters, for example, a feature amount of histograms of oriented gradients (HOG) may be used, but any other feature amount may be used.

Figure 12:
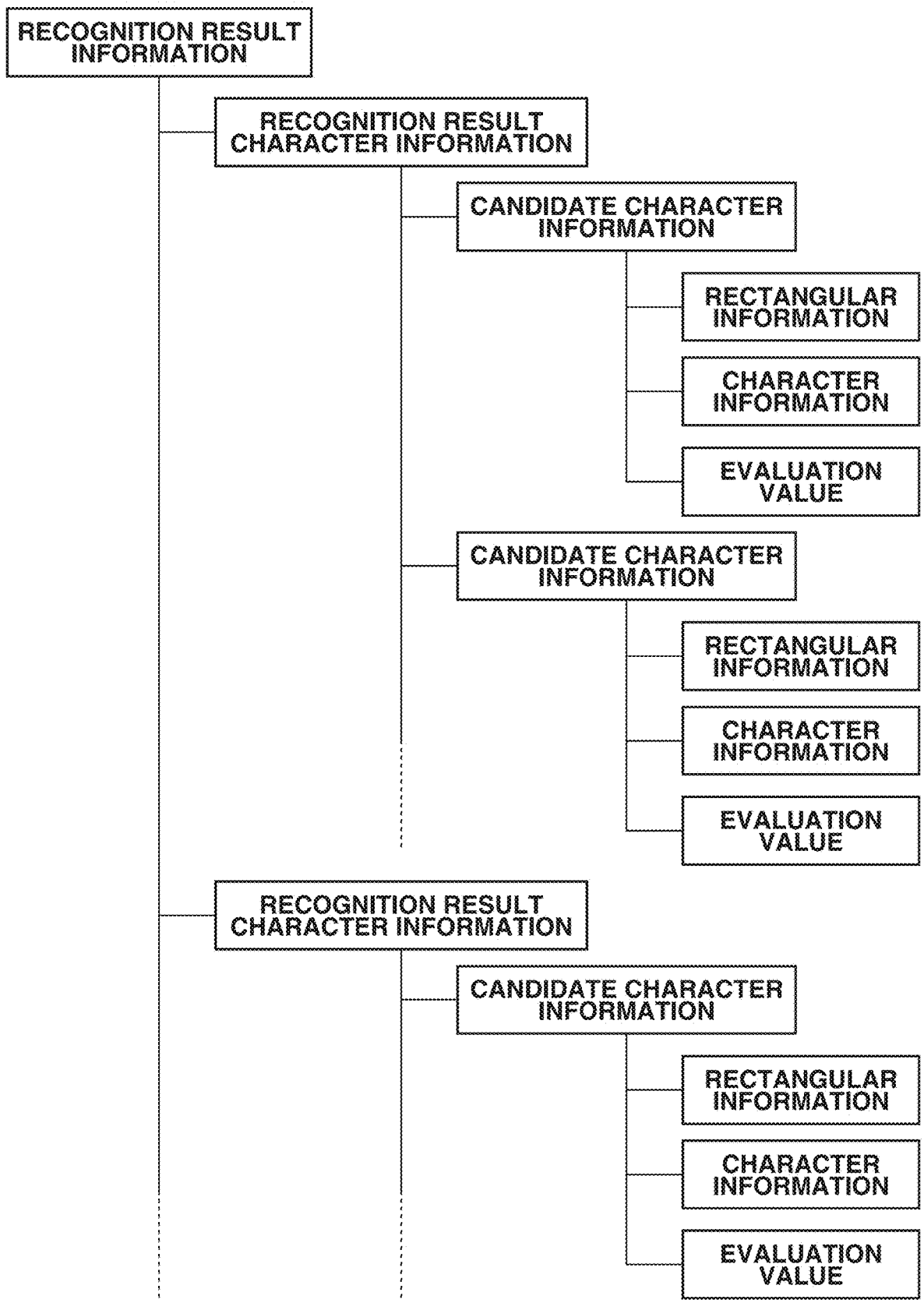
FIG. 12 is a block diagram illustrating one example of a data structure of a character recognition result.

FIG. 12 illustrates one example of a data structure of result information from character recognition processing executed by the character recognition unit 307. Recognized result information includes a plurality of pieces of recognition result character information. The recognition result character information is associated with the recognition result of each character, and the plurality of pieces of the candidate character information is provided for one piece of the recognition result character information. Since the serial ID 107 according to the present exemplary embodiment has 9 digits, recognition result information includes nine pieces of recognition result character information associated with the respective digits. Further, each piece of the candidate character information includes rectangular information (a position and a size of a cutout area associated with each candidate character), character information (character code), and an evaluation value. The evaluation value is calculated by weighting a correlation coefficient (similarity) obtained by comparing feature information of character image information in FIG. 11 with feature information extracted from an image cut out from a cutout area in accordance with the distance with respect to the approximation straight line.

Figure 13:
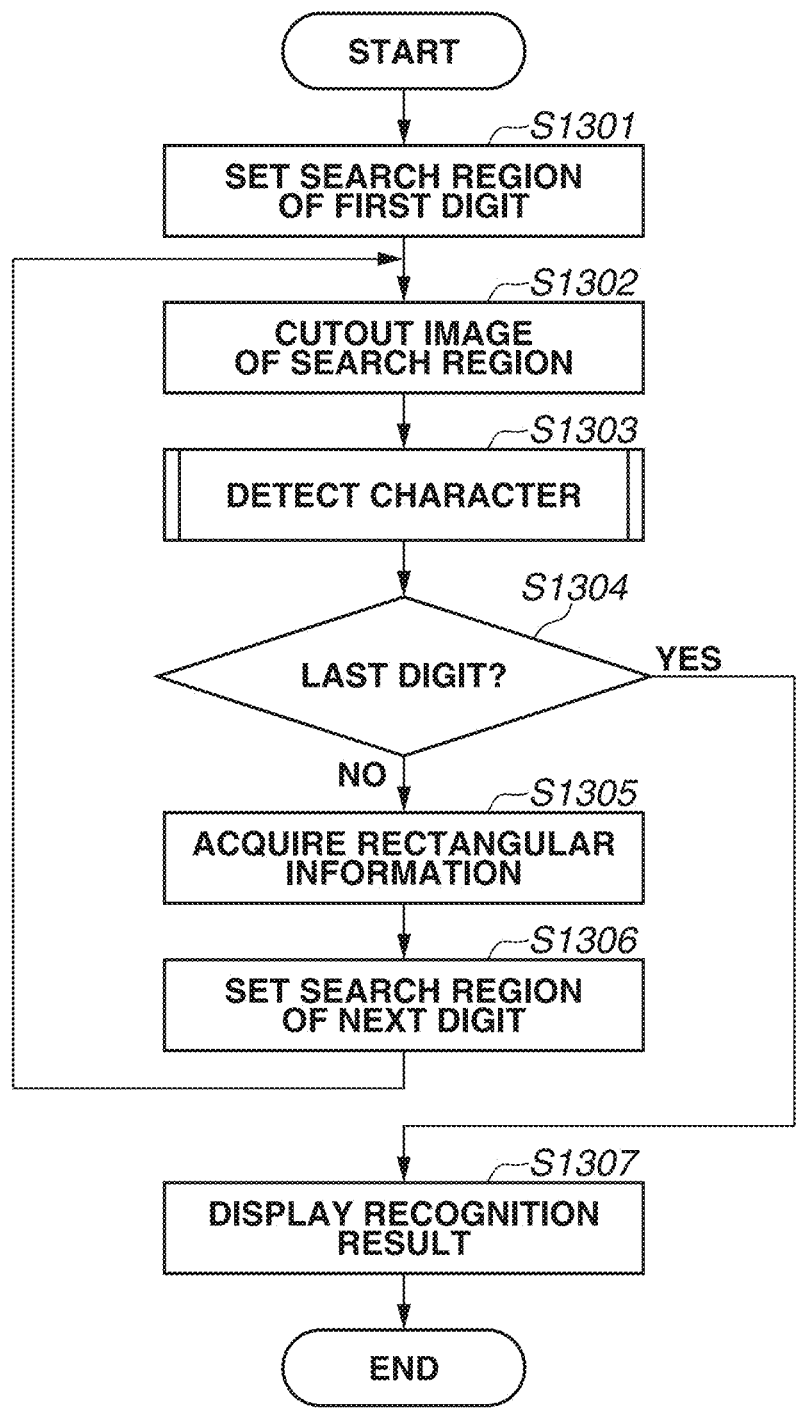
FIG. 13 is a flowchart illustrating details of the character recognition processing.

FIG. 13 is a flowchart illustrating details of the character recognition processing to be executed after the character recognition unit 307 of the mobile application 302 captures an image of a tire.

In step S1301, the character recognition unit 307 sets a search area (502 in FIG. 5) of a first digit character for the recognition target image 501 cut out from the captured image based on the guides.

In step S1302, the character recognition unit 307 segments an image of the search area.

In step S1303, the character recognition unit 307 sequentially sets the cutout areas with respect to the cutout image in the search area and performs comparison with the dictionary data for similarities to detect positions of the cutout areas and candidate characters for the respective positions (character detection processing). Details of the processing in step S1303 will be described below with reference to FIG. 14.

In step S1304, the character recognition unit 307 determines whether the detected character is a final digit (9th digit) character. If it is determined that the detected character is the final digit character (YES in step S1304), the processing proceeds to step S1307. If it is determined that the detected character is not the final digit character (NO in step S1304), the processing proceeds to step S1305.

In step S1305, the character recognition unit 307 searches the recognition result character information illustrated in FIG. 12 for candidate character information with the highest evaluation value to acquire rectangular information (position information about the cutout area associated with the candidate character information).

In step S1306, a search area for a next character is set based on the rectangular information acquired in step S1305, and the processing proceeds to step S1302.

In step S1307, the character recognition unit 307 displays the recognition result on a recognize result display area 608 on the screen via the information display unit 304 and terminates the processing.

Figure 14:
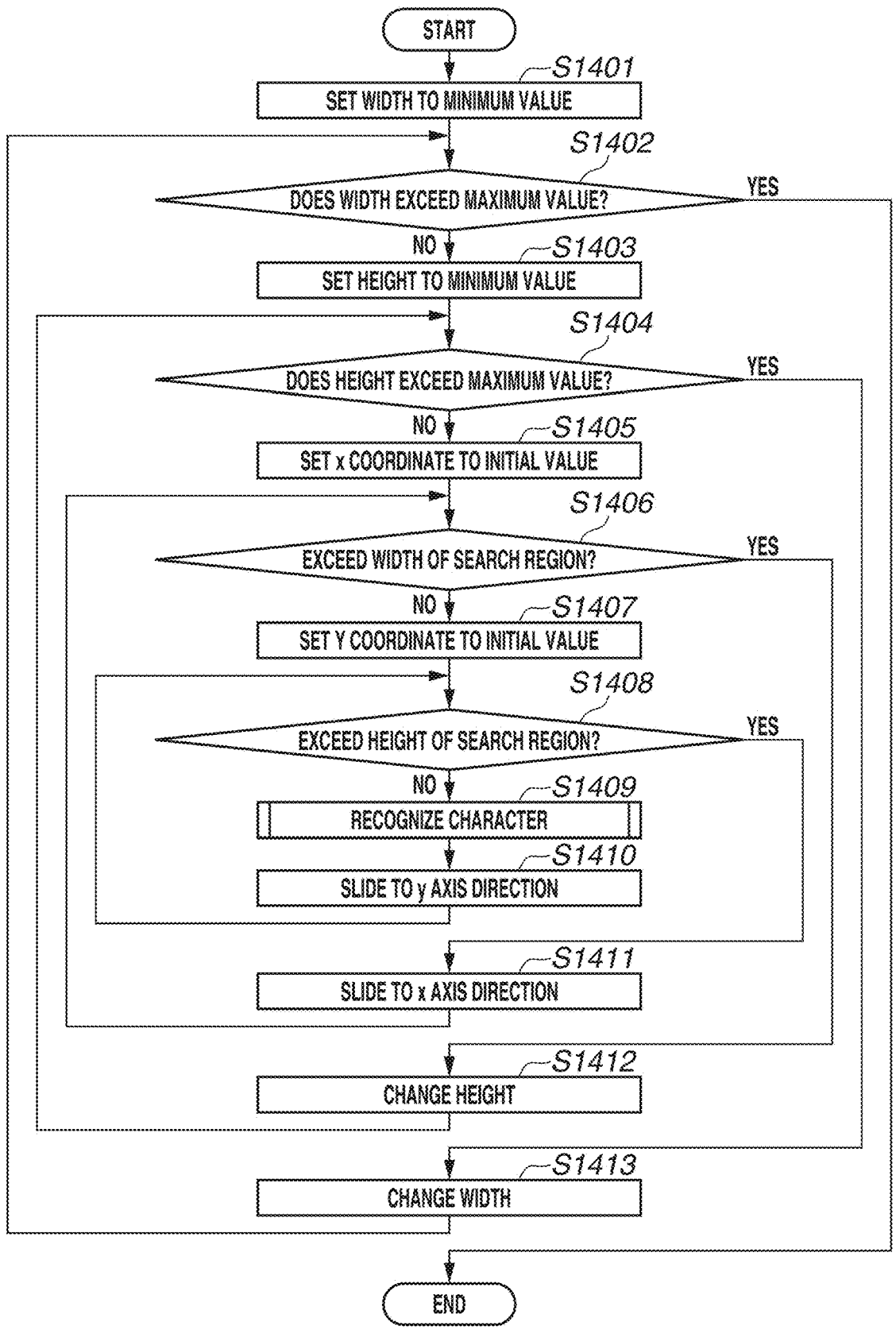
FIG. 14 is a flowchart illustrating details of character detection processing.

FIG. 14 is a flowchart illustrating details of the character detection processing in step S1303 of FIG. 13. FIG. 14 particularly illustrates details of processing for setting cutout areas at a plurality of positions in the search area while changing a size of the cutout area to execute the recognition processing.

In step S1401, the character recognition unit 307 sets widths of the cutout areas (505 and 506 in FIG. 5) to a minimum value, and the processing proceeds to step S1402.

In step S1402, the character recognition unit 307 determines whether the widths of the cutout areas have exceeded a predetermined maximum value. If determining that the widths have exceeded the predetermined maximum value (YES in step S1402), the character recognition unit 307 terminates the processing. If determining that the widths have not exceeded the predetermined maximum value (NO in step S1402), in step S1403 the character recognition unit 307 sets the height of the cutout areas to a minimum value, and the processing proceeds to step S1404.

In step S1404, the character recognition unit 307 determines whether the heights of the cutout areas have exceeded a predetermined maximum value. If determining that the heights of the cutout areas have exceeded the predetermined maximum value (YES in step S1404), in step S1413 the character recognition unit 307 increases the widths of the cutout areas, and the processing proceeds to step S1402. If determining that the heights of the cutout areas have not exceeded the predetermined maximum value (NO in step S1404), the processing proceeds to step S1405.

In step S1405, the character recognition unit 307 sets an x coordinate at the left end of the cutout area to an initial value (an x coordinate at the left end of the search area), and the processing proceeds to step S1406. In step S1406, the character recognition unit 307 determines whether an x coordinate at a right end of the cutout area has exceeded the x coordinate at the right end of the search area. If determining that the x coordinate at the right end of the cutout area has exceeded the x coordinate at the right end of the search area (YES in step S1406), in step S1412, the character recognition unit 307 increases the height of the cutout area by a predetermined amount, and the processing proceeds to step S1404. If determining that the x coordinate at the right end of the cutout area has not exceeded the x coordinate at the right end of the search area (NO in step S1406), in step S1407, the character recognition unit 307 sets a y coordinate at an upper end of the cutout area to an initial value (a y coordinate at an upper end of the search area), and the processing proceeds to step S1408.

In step S1408, the character recognition unit 307 determines whether a y coordinate at a lower end of the cutout area has exceeded a y coordinate at a lower end of the search area. If determining that the y coordinate at the lower end of the cutout area has exceeded the y coordinate at the lower end of the search area (YES in step S1408), in step S1411, the character recognition unit 307 causes the cutout area to slide in an x axis direction (increases the x coordinate), and the processing proceeds to step S1406. If determining that the y coordinate at the lower end of the cutout area has not exceeded the y coordinate at the lower end of the search area (NO in step S1408), in step S1409, the character recognition unit 307 executes comparison processing (character recognition processing) between the image of the cutout area and the character image information (dictionary data). Details of the processing in step S1409 will be described below with reference to FIG. 15. In step S1410, the character recognition unit 307 causes the cutout area to slide in the y axis direction (increases the y coordinate), and the processing proceeds to step S1408.

Figure 15:
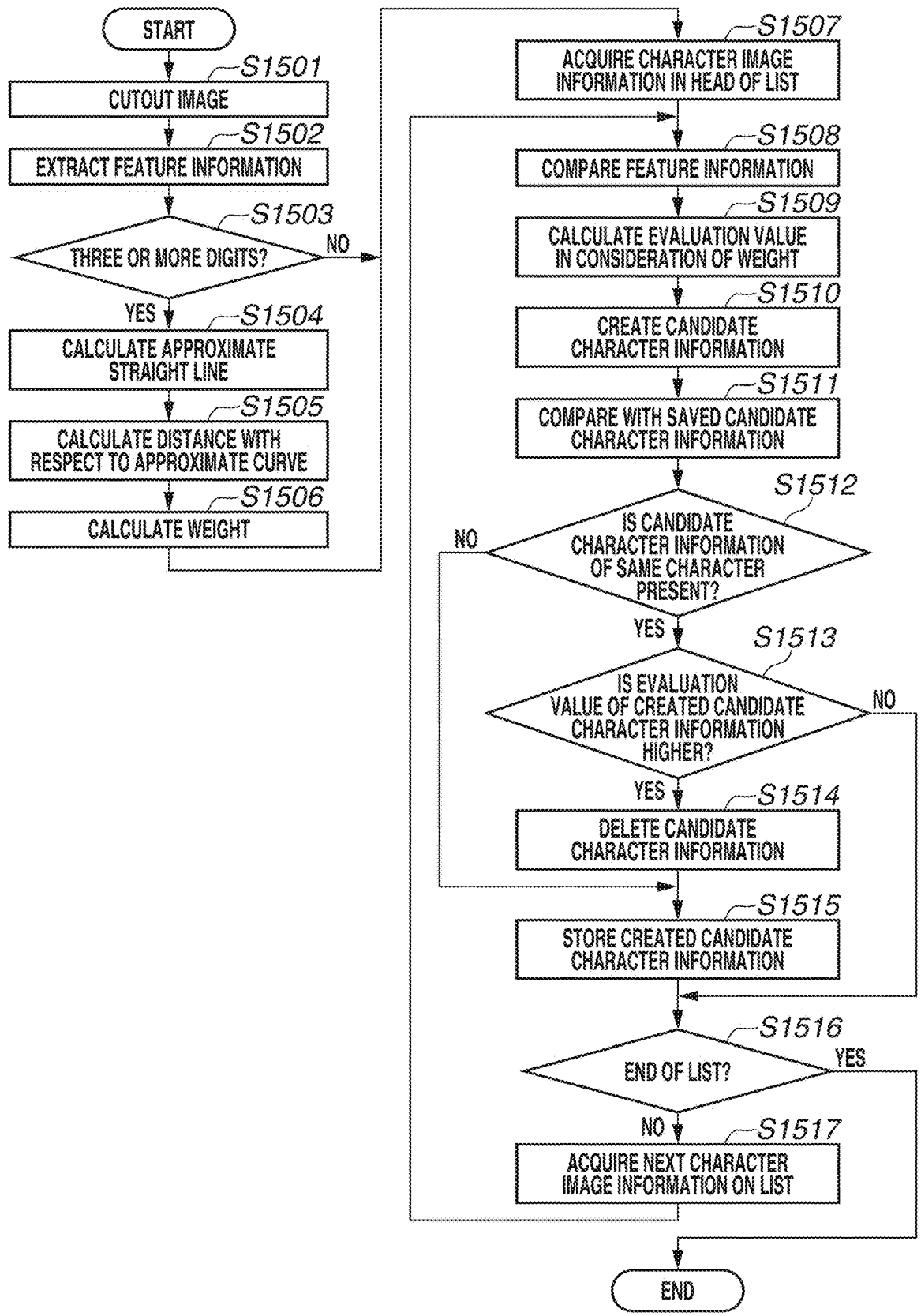
FIG. 15 is a flowchart illustrating details of the character recognition processing.

FIG. 15 is a flowchart illustrating details of the character recognition processing in step S1409 of FIG. 14.

In step S1501, the character recognition unit 307 cuts out images of the cutout areas (505 and 506 in FIG. 5), and in step S1502, the image processing unit 306 extracts feature information (an HOG feature amount) from the cutout images.

In step S1503, the character recognition unit 307 determines whether the character recognition processing is for a third digit character or characters after the third digit one. Specifically, the determination is made based on whether two or more pieces of recognition result character information are included in the recognition result information in FIG. 12. If the determination is made that the processing is not for the third digit character or the characters after the third digit one (NO in step S1503, meaning that the processing is for the first or second digit character), the processing proceeds to step S1507. If determining that the processing is for the third digit character or the characters after the third digit one (YES in step S1503), in step S1504, the character recognition unit 307 calculates an approximation straight line. Specifically, the character recognition unit 307 extracts, for the recognition result character information for each digit included in the recognition result information in FIG. 12, rectangular information of candidate character information with the highest evaluation value included in each recognition result character information to calculate an approximation straight line. In a method for calculating the approximation straight line, the character recognition unit 307, for example, calculates coordinates of center points from the rectangular information, and calculates the approximation straight line from the coordinates of the center points of respective digits using a least squares method. More specifically, when the character recognition processing is for an n-th digit character, the character recognition unit 307 calculates the approximation straight line based on the coordinates of the center points in the cutout areas for the respective digits in the recognition processing results of up to (n−1)st digit character.

In step S1505, the character recognition unit 307 calculates a distance between the approximation straight line calculated in step S1504 and the coordinates of the center points at positions where the images are cut out in step S1501.

In the present exemplary embodiment, the approximation straight line is obtained by using the coordinates of the center points in the rectangular information of the cutout areas, and the distances between the center points of the cutout areas and the approximation straight line are obtained. However, the calculation of the approximation straight line and the distances is not limited to these methods. For example, the approximation straight line and the distances may be obtained by using coordinates of an apex on an upper left or a lower right of the rectangles in the cutout area.

In step S1506, a weight is calculated based on the distance calculated in step S1505. The calculation of the weight uses a formula such that the weight is larger as the distance is shorter and the weight is smaller as the distance is longer. For example, an exponential function w ($=a^d$) may be used. In such a case, the weight w can be calculated by assigning the distance to a variable d, where a constant a satisfies a condition of 0<a<1.

Note that an influence rate (contribution rate) of the weighting based on the distance may be changed in accordance with a number of points to be used for calculation of the approximation straight line (i.e., the number of characters as recognition results). Taking the exponential function as an example, as the number of points to be used for calculation of the approximation straight line increases, the constant a is set smaller. The smaller the constant a, the greater the influence of the weighting according to the distance from the approximation straight line.

In step S1507, the character recognition unit 307 acquires character image information (dictionary data) at a head of the character image information list illustrated in FIG. 11.

In step S1508, the character recognition unit 307 compares feature information included in the acquired character image information with the feature information extracted in step S1502 to obtain a correlation coefficient (similarity).

In step S1509, the character recognition unit 307 obtains, as an evaluation value, a correlation coefficient (weighting similarity) calculated by multiplying the correlation coefficient (similarity) obtained in step S1508 and the weight calculated in step S1506. Evaluation values are obtained for first to second digit characters with the weight w=1. In another words, for first to second digit characters, the correlation coefficient (similarity) obtained in step S1508 is used directly as the evaluation values.

In step S1510, the character recognition unit 307 creates the candidate character information illustrated in FIG. 12, and sets the evaluation value calculated in step S1509. At this time, character information of the character image information is set as character information (character code) of the candidate character information, and a position and a size of the cutout area are set for the rectangular information.

In step S1512, the character recognition unit 307 searches the candidate character information of the recognition result character information (illustrated in FIG. 12) for a certain digit character in processing, and determines whether candidate character information whose character information matches the character information of the candidate character information created in step S1510 is already present. If the determination is made that candidate character information with matched character information is not present (NO in step S1512), the processing proceeds to step S1515. If the determination is made that candidate character information with matched character information is already present (YES in step S1512), the processing proceeds to step S1513.

In step S1513, the character recognition unit 307 determines whether the evaluation value of the candidate character information created in step S1510 is higher than the evaluation value of the candidate character information which is already present. If the determination is made that the evaluation value of the candidate character information created in step S1510 is not higher (NO in step S1513), the processing proceeds to step S1516.

On the other hand, if the determination is made that the evaluation value of the candidate character information created in step S1510 is higher (YES in step S1513), the processing proceeds to step S1514. The character recognition unit 307 then deletes the stored candidate character information of the recognition result character information. In step S1515, the character recognition unit 307 stores the candidate character information created in step S1510 into the recognition result character information, and the processing proceeds to step S1516.

In step S1516, the character recognition unit 307 determines whether the character image information is the one at the end of character image information list. If the determination is made that the character image information is not the one at the end of the list (NO in S1516), in step S1517, the character recognition unit 307 acquires next character image information in the character image information list. If the determination is made that the character image information is the one at the end of the character image information list (YES in step S1516), the processing terminates.

In the present exemplary embodiment, the similarity obtained by comparing the cutout area image with the dictionary data is multiplied by the weight according to the distance between the position of the cutout area and the approximation straight line. In such a manner, the evaluation value is obtained. Therefore, when a plurality of cutout area candidates having close similarities is present, the cutout area candidate at a closer distance with respect to the approximation straight line is selected as the recognition result.

More specifically, in the character recognition method in which a plurality of areas is cut out, while shifting positions, from a search area estimated to contain a character and the character recognition processing is performed based on the plurality of cutout areas, an evaluation value is calculated by weighting according to a position of the cutout area. This improves accuracy of the character recognition processing.

In a second exemplary embodiment, after the character recognition processing described in the first exemplary embodiment is executed, an approximation straight line is calculated from cutout areas of all digits. The images are rotated so that the approximation straight line becomes horizontal, and the character recognition processing is executed again. This processing can produce more accurate recognition results. This is because a similarity can be determined more accurately in a case where comparison, in terms of feature amount, is made between an inclination corrected image and the character image information (of a character in uninclined state) than in a case where the comparison is made between an inclined image and the character image information (of a character in uninclined state).

FIG. 16 illustrates images that are corrected based on an approximation straight line obtained based on the recognition result in FIG. 10. An approximation straight line 1601 is calculated from the cutout area 1001. An image 1602 is obtained by rotating the recognition target image 801 so that the approximation straight line 1601 becomes horizontal. In the present exemplary embodiment, the character recognition processing is executed again on the image 1602 where the inclination has been corrected.

Figure 17:
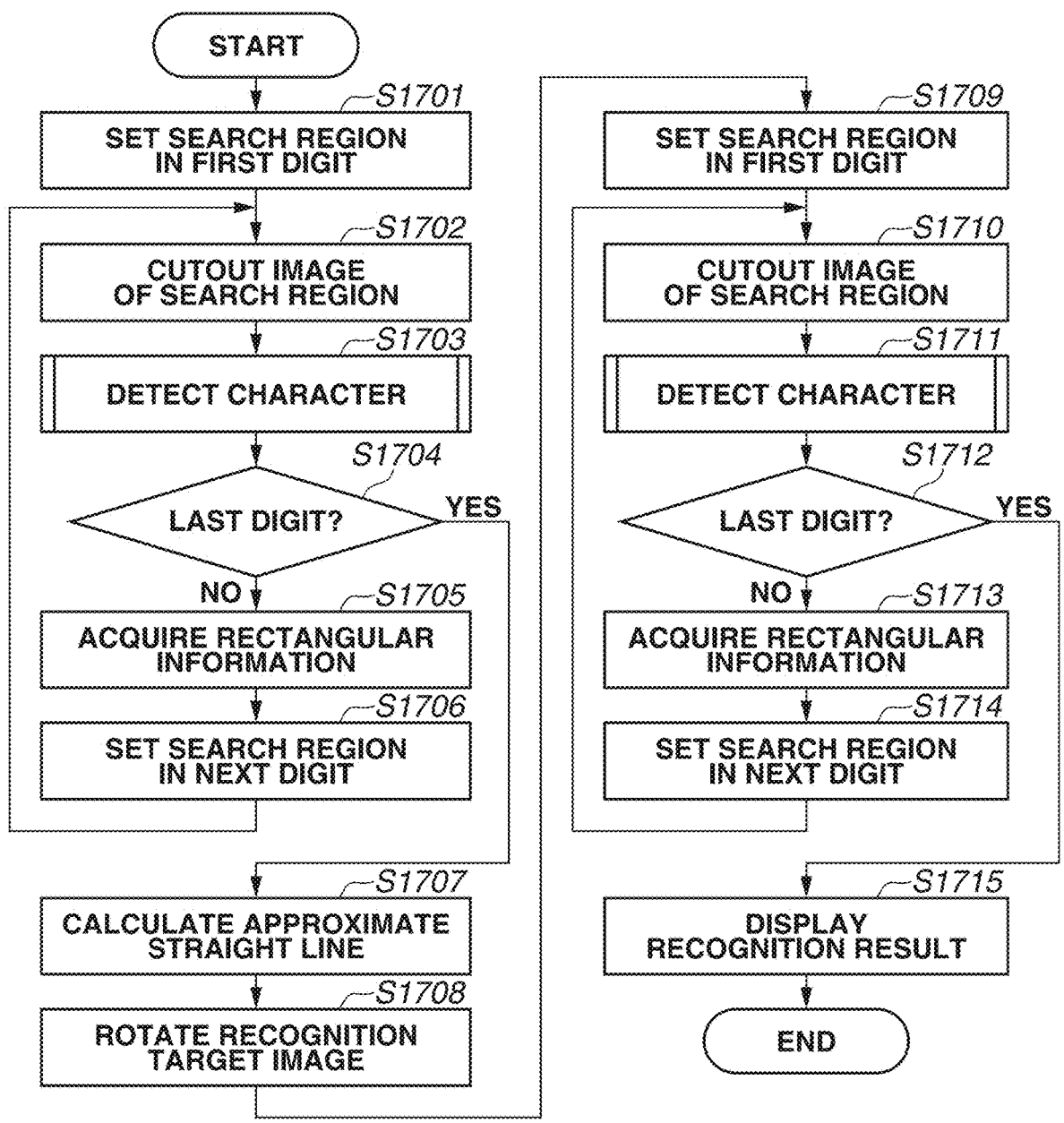
FIG. 17 is a flowchart illustrating details of the character recognition processing according to a second exemplary embodiment.

FIG. 17 is a flowchart illustrating details of the character recognition processing to be executed after an image of a tire is captured. Processing in steps S1701 to S1706 and processing in steps S1709 to S1714 are similar to the processing in step S1301 to S1306 in the flowchart of FIG. 13 in the first exemplary embodiment. Further, processing in step S1715 is similar to the processing in step S1307. In step S1707, the character recognition unit 307 calculates an approximation straight line based on a cutout area position (rectangular information) of the recognition result obtained by the processing in steps S1701 to S1706. In step S1708, the character recognition unit 307 rotates the recognition target image to correct an inclination so that the calculated approximation straight line becomes horizontal. Thereafter, the processing in steps S1709 to S1715 is executed on the image that has been subject to inclination correction.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-230827, filed Nov. 29, 2016, which is hereby incorporated by reference herein in its entirety.

What is claimed is:

1. An apparatus comprising:
a first setting unit configured to set a search area on a recognition target image;
a second setting unit configured to set cutout areas at a plurality of positions in the search area; and
a character detection unit configured to extract images respectively corresponding to the plurality of cutout areas, obtain an approximation straight line based on the positions of the cutout areas output as recognition results of other characters, obtain similarities of candidate characters by comparison between the extracted images and dictionary data, obtain evaluation values of the candidate characters by weighting the obtained similarities of candidate characters based on distances between the positions of the respective cutout areas and the obtained approximation straight line, and output, as a recognition result, a candidate character with a highest evaluation value among the obtained candidate characters,
wherein the first setting unit further sets a search area relating to a next character based on position information of the cutout area corresponding to the recognition result output from the character detection unit.

2. The apparatus according to claim 1 wherein processing executed by the second setting unit and the character detection unit is repeated.

3. The apparatus according to claim 1, wherein the character detection unit changes a value of the weighting in accordance with a number of the recognition results of the other characters used for obtaining the approximation straight line.

4. The apparatus according to claim 1, further comprising:
a correction unit configured to rotate the recognition target image so that the approximation straight line becomes horizontal after the detection unit detects all characters on the recognition target image.

5. The apparatus according to claim 4, wherein the processing by the first setting unit, the second setting unit, and the character detection unit is again executed on the recognition target image corrected by the correction unit.

6. A non-transitory computer-readable storage medium storing a computer program that causes a computer to perform:
first setting for setting a search area on a recognition target image;
second setting for setting cutout areas at a plurality of positions in the search area; and
character detection for extracting images respectively corresponding to the plurality of cutout areas, obtaining an approximation straight line based on the positions of the cutout areas output as recognition results of other characters, obtaining similarities of candidate characters by comparison between the extracted images and dictionary data, obtaining evaluation values of the candidate characters by weighting the obtained similarities of candidate characters based on distances between the positions of the respective cutout areas and the obtained approximation straight line, and outputting, as a recognition result, a candidate character with a highest evaluation value among the obtained candidate characters,
wherein in the first setting, a search area relating to a next character is set based on position information about the cutout area corresponding to the output recognition result in the character detection.

7. The non-transitory computer-readable storage medium according to claim 6, wherein the second setting and the character detection are repeatedly performed.

8. The non-transitory computer-readable storage medium according to claim 6, wherein in the character detection, a value of the weighting is changed in accordance with a number of the recognition results of the other characters used for obtaining the approximation straight line.

9. The non-transitory computer-readable storage medium according to claim 6, wherein the computer program causes the computer to further perform:
correction for rotating the recognition target image so that the approximation straight line becomes horizontal after detecting all characters in the recognition target image in the character recognition.

10. The non-transitory computer-readable storage medium according to claim 9, wherein the first setting, the second setting, and the character detection are again performed on the recognition target image corrected by the correction.

11. A method, comprising:
   first setting for setting a search area on a recognition target image;
   second setting for setting cutout areas at a plurality of positions in the search area; and
   character detection for extracting images respectively corresponding to the plurality of cutout areas, obtaining an approximation straight line based on the positions of the cutout areas output as recognition results of other characters, obtaining similarities of candidate characters by comparison between the extracted images and dictionary data, obtaining evaluation values of the candidate characters by weighting the obtained similarities of candidate characters based on distances between the positions of the respective cutout areas and the obtained approximation straight line, and outputting, as a recognition result, a candidate character with a highest evaluation value among the obtained candidate characters,
   wherein in the first setting, a search area relating to a next character is set based on position information about the cutout area corresponding to the recognition result output in the character detection.

12. The method according to claim 11, wherein the second setting and the character detection are repeatedly performed.

13. The method according to claim 11, wherein in the character detection, a value of the weighting is changed in accordance with a number of the recognition results of the other characters used for obtaining the approximation straight line.

14. The method according to claim 11, further comprising:
   correction for rotating the recognition target image so that the approximation straight line becomes horizontal after detecting all characters in the recognition target image in the character recognition.

15. The method according to claim 14, wherein the first setting, the second setting, and the character detection are again performed on the recognition target image corrected by the correction.

* * * * *